US006724863B1

(12) United States Patent
Bedingfield

(10) Patent No.: US 6,724,863 B1
(45) Date of Patent: Apr. 20, 2004

(54) METHOD AND SYSTEM FOR MESSAGE ROUTING

(75) Inventor: James C. Bedingfield, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 482 days.

(21) Appl. No.: 09/742,377

(22) Filed: Dec. 22, 2000

(51) Int. Cl.[7] ............................................... H04M 1/64
(52) U.S. Cl. .................. 379/88.12; 379/88.11; 379/88.25; 379/88.22; 379/220.01; 455/413
(58) Field of Search ........................... 379/88.12, 88.11, 379/88.13, 220.01

(56) References Cited

U.S. PATENT DOCUMENTS 6,002,750 A * 12/1999 Ertz ........................ 379/88.12

* cited by examiner

Primary Examiner—Ahmad F. Matar
Assistant Examiner—Karen Le
(74) Attorney, Agent, or Firm—Shaw Pittman LLP

(57) ABSTRACT

A method and system for forwarding information, such as a message waiting indicator (MWI) message, to a telephone number corresponding to a foreign network (e.g., a wireless network) and a shared NPA/NXX. The invention evaluates individual telephone numbers of shared NPA/NXXs to determine to what networks to send information. In a representative embodiment, the invention uses a pseudo NPA to deliver an MWI message from a messaging service provider to a wireless (i.e., foreign network) telephone number of a shared NPA/NXX. A voicemail platform delivers to a signal transfer point an MWI message that references a pseudo NPA. The signal transfer point translates the pseudo NPA to a point code corresponding to the foreign network, and routes the MWI message to the point code. A converter of the foreign network translates the pseudo NPA back to the associated real NPA.

32 Claims, 3 Drawing Sheets

METHOD AND SYSTEM FOR MESSAGE ROUTING

BACKGROUND

1. Field of the Invention

The present invention relates to the field of switched telephony, and more particularly, to a method and system for integrating wireless telephones into a wireline messaging environment.

2. Background of the Invention

With the proliferation of wireless communication networks, many telephone customers now use a combination of wireline and wireless telephones to meet their communication needs. Indeed, it is not uncommon for a single user to have more than one telephone line at home, more than one telephone line at work, and at least one wireless telephone. Telephone customers have come to depend on the flexibility of this combination to communicate irrespective of location.

However, having multiple wireline and wireless telephone numbers presents problems retrieving telephone messages. Usually, a caller who calls a user who subscribes to multiple telephone lines dials one of the user's telephone numbers. If the user is away from the particular device that is called and does not answer the call, the caller typically leaves a message on a voicemail system. In the past, such voicemail systems have been isolated on the network of the particular telephone line that is called. Thus, to retrieve all messages, a user had to check the voicemail system of each network separately.

Recognizing the trouble of constantly checking multiple voicemail systems, messaging service providers (MSPs) developed voicemail systems that integrate incoming messages across different networks. Thus, for example, a user could direct all messages for her wireline and wireless telephone lines to a single voicemail box. Consequently, the user would need only to check a single voicemail box to retrieve all messages.

According to these standard voicemail systems, a voicemail platform is in communication with a central office switch. The central office switch is in communication with the wireline and wireless networks. Unanswered calls to a subscriber's wireline and wireless telephone numbers are routed to the voicemail platform through the central office. Thus, regardless of the particular telephone number the caller dials, all voicemail messages end up in the same voicemail platform.

Despite providing centralized voicemail boxes, these integrated voicemail services present difficulties in notifying a user of the receipt of a message. Specifically, because all unanswered calls are forwarded through the central office to the voicemail platform, the voicemail platform is responsible for activating message waiting indicators on all of the associated telephones (e.g., a stutter dial tone, an illuminated light, or a displayed icon). Thus, for example, if a user away from his work office receives an unanswered call to his wireline office telephone, and the call is forwarded to the voicemail platform, which records a message, then, ideally, the user would want to receive a message waiting indicator on his wireless telephone to report to him that he has received a new voicemail message. This notification would avoid the burden of constantly checking the voicemail for messages received through a remote telephone. Similarly, if the user is in his office and receives a message through an unanswered call to his wireless telephone, which is turned off or out of range, the user would want to receive an indication of the message on his office wireline telephone.

To provide message waiting indicators on all of a user's associated telephones, wireline network providers developed methods for supporting messaging from the voicemail platform to a "foreign network." As used herein, "foreign network" refers to a network that is not local to the network including the central office switch that serves the message provider. This local central office switch is sometimes referred to herein as the host switch.

FIG. 1 illustrates a typical method and system for providing messaging from a voicemail platform to a foreign network. Messaging service provider 100 contains a telephone list 102 indicating telephone numbers that a subscriber to the messaging service has associated with her voicemail box. An unanswered call to any of the listed telephone numbers is routed to messaging service provider 100 for the recording of a message and the indicating of the recorded message. In this example, the subscriber has associated with the messaging service a wireline telephone number, 404-332-212X, and two wireless telephone numbers, 404-792-123X and 404-792-100X.

Telephone list 102 also contains an activation flag indicating whether the subscriber has subscribed to the message waiting indicator (MWI) feature for the particular telephone number (device). In some instances, for example, on a seldom-used mobile telephone, a subscriber might not care to have nor want to pay for an MWI displayed on the telephone. In this example, the subscriber has opted for the MWI feature on two telephone lines, 404-332-212X and 404-792-123X.

Once messaging service provider 100 receives an unanswered call to one of the three telephone numbers and records a message, messaging service provider 100 sends an MWI message for each of the activated telephone numbers on list 102. For the wireline telephone number, messaging service provider 100 transmits an MWI message to a host switch 104 using Inter-switch Simplified Message Desk Interface (ISMDI). Host switch 104 is a central office switch. ISMDI is a signaling interface used by a messaging service provider to support incoming call and message waiting integration between all supported switches in a Local Access and Transport Area (LATA). Simplified Message Desk Interface (SMDI) defines signaling between a messaging system and a central office switch, which defines the original intended destination of a forwarded call.

After receiving an MWI message for the wireline telephone number 404-332-212X, host switch 104 determines if it "owns" (i.e., is associated with) the NPA/NXX (NPA—Numbering Plan Area/NXX—a specific central office) corresponding to the telephone number, and further, if it owns the particular number (last four digits). In this example, host switch 104 does own 404-332-212X. Therefore, host switch 104 activates an MWI on the subscriber's wireline telephone 106, which could be a stutter dial tone, for example.

For the wireless telephone number 404-792-123X, messaging service provider 100 forwards to host switch 104 an ISMDI MWI message that references the wireless telephone number. Host switch 104 determines that it does not own 404-792, and in response, forwards to a signal transfer point 108 an MWI message using a non-call-associated Signaling System 7 (SS7) signaling protocol, such as Transaction Capability Application Part (TCAP).

Wireline network signal transfer point 108 contains a table 110 that cross-references NPA/NXXs with network point codes. Point codes identify every node in the SS7 network in the format NNN CCC XXX, where NNN is a network identifier, CCC is a cluster identifier, and XXX is the node identifier. In this example, table 110 shows that 404-792 corresponds to point code 001.002.052. With this routing information, wireline network signal transfer point 108 transmits a TCAP MWI message to wireless network signal transfer point 112, which services the wireless network 114 corresponding to point code 001.002.052. In this example, wireless network 114 is the foreign network.

Within wireless network 114, protocol gateway 116 translates the TCAP MWI message to a signaling protocol compatible with the wireless network, for example, Interim Standard 41 (IS41). After the translation, protocol gateway 116 transmits an MWI message through mobile switching center 118 and antenna 120 to the subscriber's wireless telephone 122. In response to the MWI message, wireless telephone 122 indicates that a message has been recorded in messaging service provider 100 by, for example, displaying an icon on its screen.

According to the conventional method shown in FIG. 1, routing is based on the 6-digit NPA/NXX, relying on the fact that the networks to which the foreign network telephone numbers belong (which, in this example, are wireless telephone numbers of a wireless network) can be identified based solely on the NPA/NXX. In other words, the method assumes that each NPA/NXX, as a block of 10,000 telephone numbers, is wholly owned by a single foreign network carrier (e.g., a single wireless carrier). Under this assumption, the host wireline telephone network can route all calls for a NPA/NXX to a particular trunk group of a foreign network carrier.

Unfortunately, not all NPA/NXXs are wholly owned by a single carrier. In fact, within a block of 10,000 telephone numbers in a NPA/NXX, some numbers may be assigned to the wireline network, some may be assigned to a wireless network, and still others may be assigned to other wireline and wireless networks. As used herein, a "shared NPA/NXX" refers to this situation, in which the block of 10,000 telephone numbers in an NPA/NXX is assigned to more than one entity. Therefore, to forward message waiting indicator messages to the proper foreign network carrier of a particular foreign network telephone number, the routing network must distinguish the foreign network telephone numbers from the other network numbers on a more granular basis. In other words, the routing network must identify the different networks to which individual telephone numbers within a single shared NPA/NXX belong.

SUMMARY OF THE INVENTION

The present invention is a method and system for forwarding information, such as a message waiting indicator message, to a telephone number of a foreign network (e.g., a wireless network) that is part of a shared NPA/NXX. Rather than relying on the simple 6-digit NPA/NXX routing of the prior art that is suitable only for wholly owned NPA/NXXs, the method and system of the present invention evaluate individual telephone numbers of shared NPA/NXXs to determine where, i.e., to what networks, information should be sent. As such, the present invention enables telephone service providers to provide customers having a telephone number of a shared NPA/NXX with the ability to receive a message waiting indicator on the telephone of the shared NPA/NXX telephone number. This expanded service offering widens a telephone service provider's customer base and generates increased profits.

In a representative embodiment of the present invention, the method and system of the present invention preferably use a special or inactive (i.e., "pseudo") NPA to deliver an MWI message from a messaging service provider to a wireless (i.e., foreign network) telephone number of a shared NPA/NXX. As used herein, in this context, the term "special" means that the NPA does not appear to be an ordinary, real NPA, e.g., a technician looking at the NPA would presume that it is not an actual NPA. A different pseudo NPA is assigned to each foreign network of a shared NPA/NXX. Then, in the telephone list of the voicemail platform, a pseudo telephone number is entered for each telephone number that corresponds to a shared NPA/NXX and to a foreign network.

The pseudo numbers are created, for example, by substituting the NPA of the telephone numbers on the telephone list with pseudo NPAs corresponding to particular networks. Thus, each pseudo telephone number is identical to its corresponding telephone number of the shared NPA/NXX and the foreign network, except that the real NPA is replaced with the pseudo NPA.

The MWI flag is activated for the new telephone number and is deactivated for the corresponding telephone number of the shared NPA/NXX and the foreign network. In the telephone list, the telephone numbers of a shared NPA/NXX that do not correspond to a foreign network are left unchanged.

The signal transfer point through which the MWI message is routed is programmed to translate the pseudo NPA to a point code corresponding to the foreign network. The signal transfer protocol routes the MWI message to the foreign network using the point code. A converter of the foreign network is programmed to translate the pseudo NPA back to the associated real NPA, so that the foreign network can determine to what telephone number the MWI message should be forwarded. Thus, the method and system of the representative embodiment of the present invention use a pseudo NPA that allows the signal transfer point to sort out telephone numbers of the shared NPA/NXX that belong to the foreign network.

Accordingly, it is an object of the present invention to deliver information to telephone numbers corresponding to shared NPA/NXXs and foreign networks.

Another object of the present invention is to integrate wireless telephones into a wireline messaging environment.

Another object of the present invention is to identify the different networks to which individual telephone numbers within a single shared NPA/NXX belong for the purpose of delivering signaling messages to the individual telephones of the different networks.

Another object of the present invention is to provide a cost-effective means for providing message waiting indicators on telephone numbers associated with shared NPA/NXXs and foreign networks, especially wireless networks.

These and other objects of the present invention are described in greater detail in the detailed description of the invention, the appended drawings, and the attached claims.

DETAILED DESCRIPTION OF THE INVENTION

As illustrated by the following representative embodiments, the present invention is a method and system for forwarding information to a foreign network telephone number that is part of a shared NPA/NXX. In this representative embodiment, the information is a message waiting indicator (MWI) message from a messaging service provider, and the foreign network is a wireless network.

Figure 1:
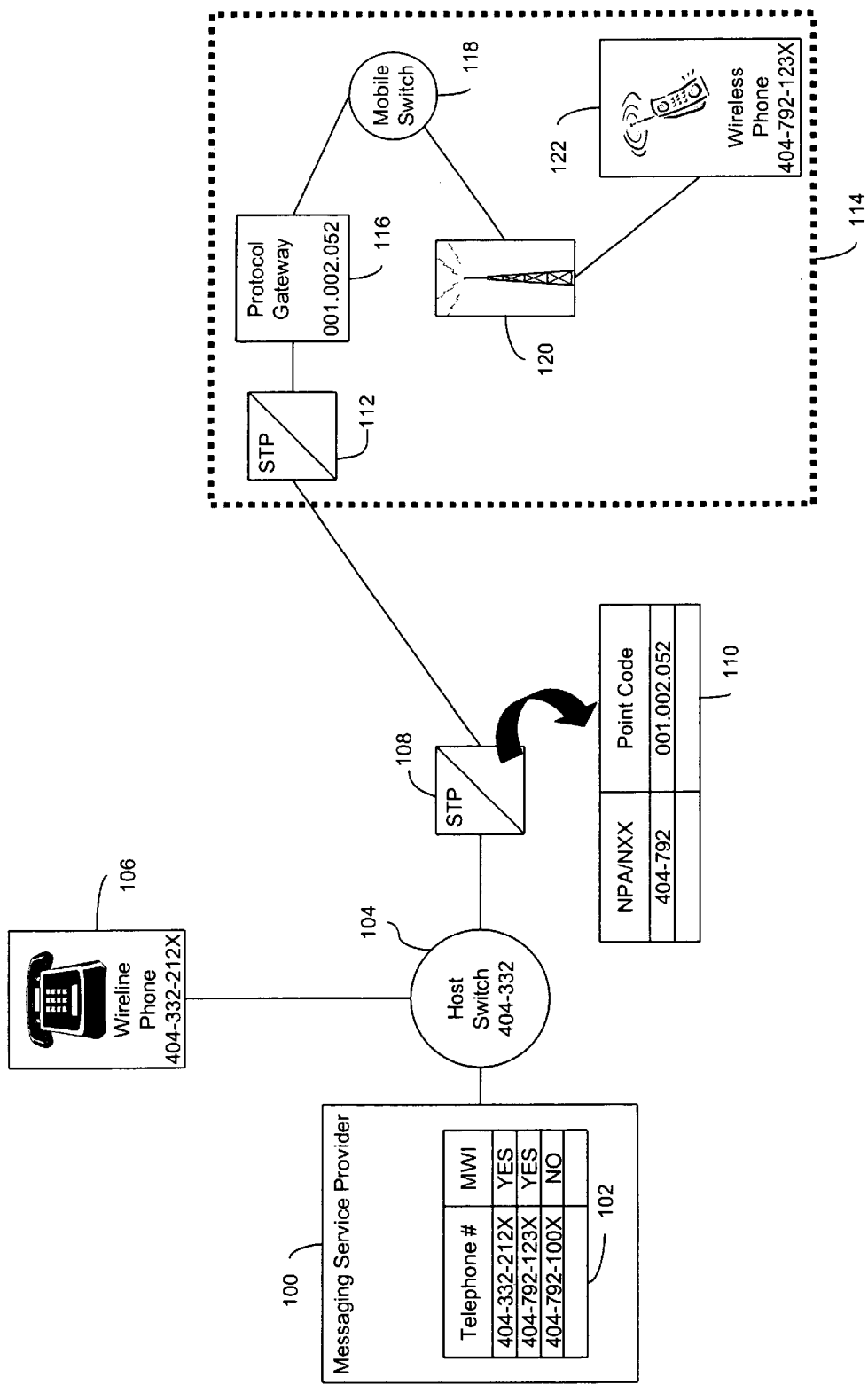
FIG. 1 is a schematic diagram of a prior art system architecture that supports messaging from a voicemail platform to a wireless network.
Figure 2:
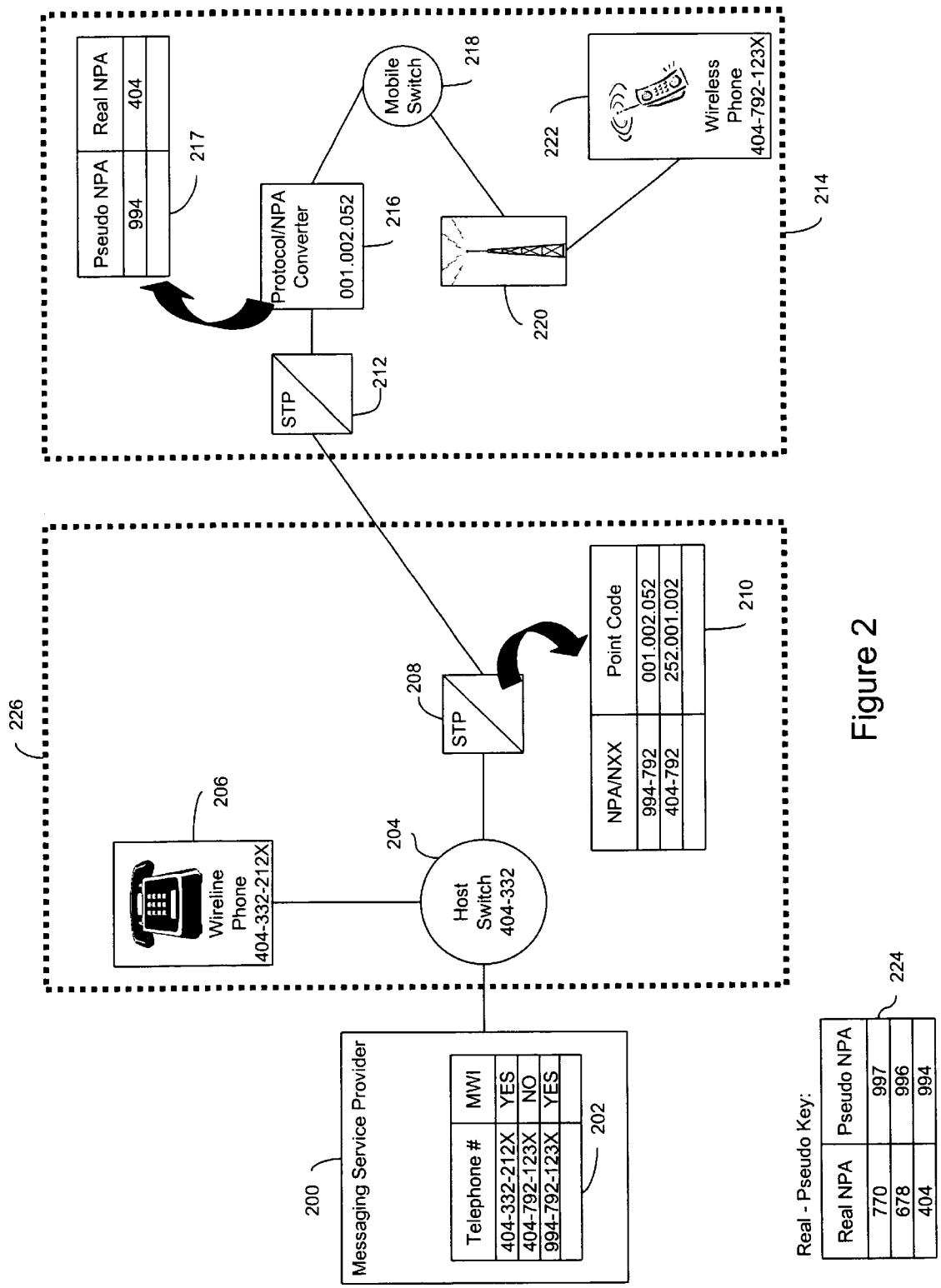
FIG. 2 is a schematic diagram of a system architecture that uses pseudo NPAs to deliver an MWI message to a wireless telephone number of a shared NPA/NXX, according to a representative embodiment of the present invention.

Referring to FIG. 2, a representative embodiment of the present invention provides a method and system that use pseudo NPAs to deliver an MWI message to a wireless telephone number of a shared NPA/NXX. The primary components of the system include a messaging service provider 200, a wireline network signal transfer point 208, and a wireless network protocol/NPA converter 216, each specially programmed to establish the pseudo NPAs. Specifically, the network service provider assigns a pseudo NPA to each shared NPA and provides corresponding entries to messaging service provider 200, wireline signal transfer point 208, and protocol/NPA converter 216. For example, as key 224 of FIG. 2 shows, the wireline network provider assigns NPAs 770, 678, and 404 to pseudo NPAs 997, 996, and 994, respectively. Preferably, though not necessarily, the pseudo NPAs are NPAs that are not in active use and are special such that, for example, a technician would recognize that they are not real NPAs.

Following the relationships of key 224, messaging service provider 200 revises telephone number list 202 by adding the new pseudo telephone number, which in this example is 994-792-123X, corresponding to 404-792-123X. As a part of this revision to telephone number list 202, messaging service provider 200 also deactivates the MWI feature for 404-792-123X and activates the MWI feature for 994-792-123X. In this manner, when messaging service provider 200 records a message for the subscriber, messaging service provider 200 forwards an MWI message for 994-792, instead of for the shared 404-792 (which would send an undeliverable message and potentially cause a network error).

Consistent with the pseudo NPAs of key 224 and list 202, signal transfer point 208 contains a translation table 210 that cross-references the pseudo NPA 994-792with a point code 001.002.052. The point code 001.002.052 is associated with the wireless network 214 that supports the subscriber's wireless telephone 222. Thus, when signal transfer point 208 receives an MWI message containing the pseudo NPA 994, signal transfer point 208 recognizes that the MWI message should be forwarded to wireless network 214.

In this example, table 210 also contains an entry cross-referencing the real NPA 404-792 with point code 252.001.002, which is a point code within the wireline network 226. This entry provides routing information (i.e., the point code) for MWI messages directed to wireline telephones of the shared NPA/NXX 404-792.

Once an MWI message is delivered to wireless network 214 using the pseudo NPA 994-792, wireless network 214 must be able to determine what the real NPA is, in order to forward the MWI message to the correct subscriber telephone. Therefore, protocol/NPA converter 216 is provisioned with a translation table 217 that cross-references the pseudo NPA 994 with the real NPA 404. By determining the real NPA from the pseudo NPA, protocol/NPA converter 216 is able to forward an IS41 MWI message to subscriber telephone 222 through wireless switch 218 and antenna 220.

Figure 3:
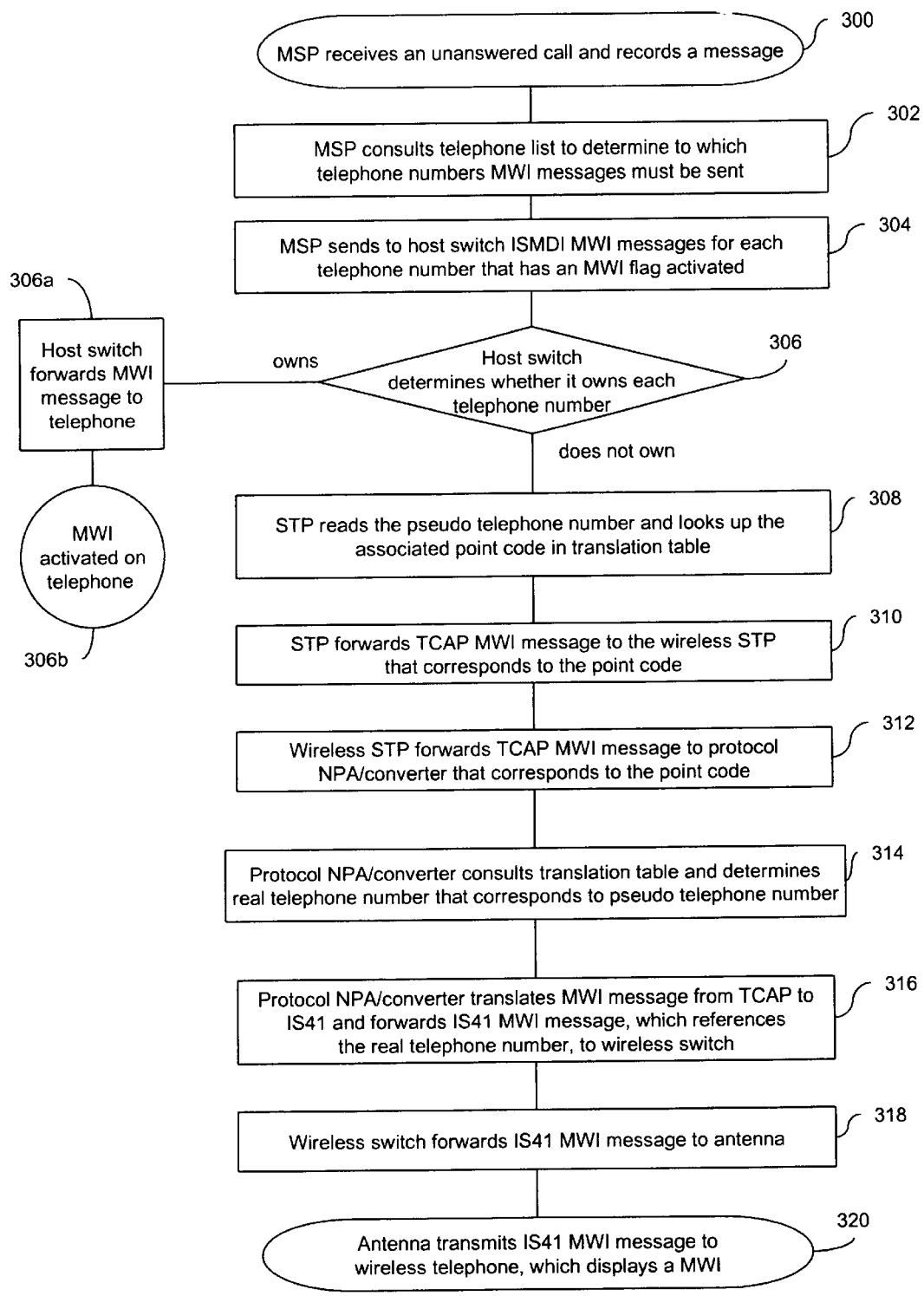
FIG. 3 is a flowchart tracing the steps of the information flow of FIG. 2.

According to this representative embodiment of the present invention, the system operates in the following manner, as shown in FIGS. 2 and 3. Although the methods described in the specification and illustrated in the figures contain many specific examples of information flow steps, these steps should not be construed as limitations on the scope of the invention. Rather, these steps should be construed as examples of information flow steps that could be used to practice the invention. As would be apparent to one of ordinary skill in the art, many other variations on the system operation are possible, including differently grouped and ordered method steps. Accordingly, for this and all other representative embodiments, the scope of the invention should be determined not by the embodiments illustrated, but by the appended claims and their equivalents.

As shown in FIG. 3, a representative embodiment of the method of the present invention commences in step 300, with messaging service provider 200 receiving an unanswered call to a telephone line of the subscriber and recording a voicemail message from the caller. In advance of step 300, FIG. 3 assumes that appropriate provisioning has taken place within the network on behalf of the subscriber to make the service of the present invention available. In addition, it should be noted at the outset that FIG. 3 traces the information flow for the example of a pseudo NPA.

In step 302, messaging service provider 200 consults list 202 to determine to which telephone numbers MWI messages must be sent. In step 304, messaging service provider 200 sends to host switch 204 ISMDI MWI messages for each telephone number that has an MWI flag activated, which in this case is the subscriber's wireline telephone number 404-332-212X and the subscriber's pseudo wireless telephone number 994-792-123X.

In step 306, host switch 204 reads the particular telephone number associated with each ISMDI MWI message to determine where to route the signaling message. For the ISMDI MWI message that references the wireline telephone number 404-332-212X, host switch 204 determines that it owns that line, and therefore, directly activates an MWI on the subscriber's wireline telephone 206 in step 306a. In step 306b, the MWI is activated on wireline telephone 206.

For the ISMDI MWI message that references the pseudo telephone number 994-792-123X, host switch 204 acknowledges that it does not own the line. Therefore, host switch 204 forwards the pseudo telephone number in the form of a TCAP MWI message to signal transfer point 208.

In step 308, signal transfer point 208 reads the telephone number associated with a message and consults translation table 210 to determine a point code corresponding to the telephone number. In this example, signal transfer point 208 determines that pseudo telephone number 994-792 corresponds to point code 001.002.052 in translation table 210. (As explained above, pseudo telephone number 994-792-123X corresponds to telephone number 404-792-123X, which is a telephone number of a shared NPA/NXX and a foreign network. However, as a contrasting example, if a telephone number, such as 404-792-567X, were part of a shared NPA/NXX but did not belong to a foreign network, then there would be no associated pseudo telephone number, and, at this point, signal transfer point 208 would determine that telephone number 404-792-567X corresponds to point code 252.001.002.)

In step 310, signal transfer point 208 forwards the TCAP MWI message to wireless signal transfer point 212, which connects the node corresponding to point code 001.002.052 to wireline network 226. Protocol/NPA converter 216 is the node corresponding to point code 001.002.052.

In step 312, signal transfer point 212 forwards the TCAP MWI message to protocol/NPA converter 216. At this point, the TCAP MWI message still references the pseudo telephone number 994-792-123X. Therefore, protocol/NPA converter 216 must translate the pseudo telephone number to the real telephone number. In step 314, protocol/NPA converter 216 consults translation table 217 and determines that the real number 404-792-123X corresponds to the pseudo number 994-792-123X.

In step 316, protocol/NPA converter 216 translates the MWI message from TCAP to IS41, for example, and forwards the IS41 MWI message, which references at telephone number 404-792-123X, to wireless switch 218. In step 318, wireless switch 218, using an appropriate air interface protocol, forwards the MWI message to antenna 220.

Finally, in step 320, antenna 220 transmits the MWI message to the subscriber's wireless telephone 222, which displays a message waiting indicator, such as an icon on the screen of wireless telephone 222.

Although the above embodiments are presented in the context of MWI messages delivered to a wireless network for display on a wireless telephone, the present invention applies equally well to any situation in which a network must distinguish between telephone numbers of a shared NPA/NXX to determine to which foreign network information should be sent. In the above example, the foreign network is a wireless network that takes the MWI message, translates it to its own protocol, and delivers it to a wireless telephone, which activates an MWI for a user to see. The functions of the present invention are completed before the MWI message is delivered to the foreign network. Therefore, as one of ordinary skill in the art would appreciate, the same systems and methods would apply to any foreign network, even other wireline networks. For example, the present invention applies to interworking message systems between independent or private wireline networks.

The foreign network could also be a global computer network, such as the Internet. In this alternate embodiment, the method and system of the present invention deliver information (e.g., an MWI message), through an appropriate protocol gateway, over the Internet to a user's network access device, e.g., a computer or wireless handheld access device. Thus, if a user is online and away from his telephone (s), an Internet-based MWI can alert the user of new messages received in his voicemail box. As an example, the Internet-based MWI could be a pop-up window displayed over the graphical user interface of a web browser. Or, conversely, using an SS7/IP gateway and pseudo NPAs, the present invention could deliver IP messages to a signal transfer point.

In addition, although the representative embodiment of the present invention is described in the context of voicemail and the delivery of MWI messages, the present invention is not limited to the delivery of this type of information. Indeed, the present invention applies to all situations in which any information must be sent to telephone numbers associated with a shared NPA/NXX and a foreign network. The information could be messages, such as electronic mail, facsimiles, or any Internet-related events, such as auction notifications or stock price threshold alerts. As another example, the present invention provides significant advantages for integrated unified messaging systems, in which a mailbox stores data from multiple media, such as facsimile, electronic mail, and voicemail. The present invention would facilitate the delivery of an indicator showing that data has been received in the mailbox of an integrated unified messaging system. Moreover, in addition to just an indicator, the present invention could also facilitate the delivery of the data stored in the mailbox.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for forwarding information in a telephone network comprising:

designating a pseudo telephone number that corresponds to a telephone number;

receiving information intended for the telephone number;

determining whether the telephone number is associated with a foreign network that is part of a shared NPA/NXX associated with the telephone number;

forwarding the information to a signal transfer point if the telephone number is associated with a foreign network that is part of a shared NPA/NXX, wherein the information references the pseudo telephone number;

determining from the pseudo telephone number a point code that corresponds to the foreign network;

forwarding the information to the point code; and translating the pseudo telephone number to the telephone number such that the information references the telephone number.

2. The method of claim 1, wherein the foreign network is a wireless network.

3. The method of claim 1, wherein the information is a message waiting indicator message.

4. The method of claim 1, wherein the information is forwarded by an integrated unified messaging system, and wherein the information is an indicator message for showing that data has been received in the integrated unified messaging system.

5. The method of claim 1, wherein the telephone number comprises a numbering plan area number (NPA) and a central office number (NXX), and the pseudo number comprises a pseudo numbering plan area number and the central office number (NXX), and wherein the pseudo numbering plan area number corresponds to the numbering plan area number (NPA).

6. The method of claim 1, wherein the step of determining the point code comprises the signal transfer point consulting a translation table that cross-references numbering plan area/central office numbers (NPA/NXXs) with point codes.

7. The method of claim 1, wherein the step of translating the pseudo telephone number to the telephone number comprises consulting a translation table of the foreign network, wherein the translation table cross-references pseudo numbering plan area numbers with real numbering plan area numbers.

8. The method of claim 1, further comprising:

translating the information to a protocol compatible with the foreign network;

transmitting the information to a telephone of the foreign network, wherein the telephone corresponds to the telephone number; and indicating receipt of the information on the telephone.

9. The method of claim 1, wherein the point code corresponds to a converter of the foreign network, and wherein the converter completes the step of translating the pseudo telephone number to the telephone number by accessing a translation table that cross-references pseudo numbering plan area numbers with real numbering plan area numbers.

10. A system for forwarding information in a telephone network comprising:

a messaging service provider;

a telephone list to which the messaging service provider has access, the telephone list including a pseudo telephone number corresponding to a telephone number;

a signal transfer point in communication with the messaging service provider;

a first translation table to which the signal transfer point has access, wherein the first translation table cross-references pseudo telephone numbers with point codes;

a converter of the foreign network in communication with the signal transfer point; and a second translation table to which the converter has access, wherein the second translation table cross-references pseudo telephone numbers with real telephone numbers.

11. The system of claim 10, wherein the messaging service provider forwards the information to the pseudo telephone number, wherein the signal transfer point translates the pseudo telephone number referenced in the information to a point code and forwards the information referencing the pseudo telephone number to the point code, and wherein the point code corresponds to the converter and the converter translates the pseudo telephone number to the telephone number and forwards the information to the telephone number.

12. The system of claim 10, wherein the foreign network is a wireless network and the signal transfer point is contained in a wireline network.

13. The system of claim 10, wherein the information is a message waiting indicator message.

14. The system of claim 10, wherein the messaging service provider is an integrated unified messaging system and the information is an indicator message for showing that data has been received in the integrated unified messaging system.

15. The system of claim 10, wherein the converter is adapted to translate the information to a protocol compatible with the foreign network.

16. The system of claim 10, further comprising:

a mobile switch in communication with the converter;

an antenna in communication with the mobile switch; and a wireless telephone in communication with the antenna, wherein the wireless telephone corresponds to the telephone number.

17. The system of claim 16, wherein the messaging service provider forwards the information to the pseudo telephone number, wherein the signal transfer point translates the pseudo telephone number referenced in the information to a point code and forwards the information referencing the pseudo telephone number to the point code, wherein the point code corresponds to the converter and the converter translates the pseudo telephone number to the telephone number and forwards the information to the mobile switch, wherein the information references the telephone number, wherein the mobile switch forwards the information referencing the telephone number to the antenna, and wherein the antenna forwards the information referencing the telephone number to the wireless telephone.

18. The system of claim 17, wherein, in response to receiving the information referencing the telephone number, the mobile switch activates one of a message waiting indicator and an indicator showing data has been received by the messaging service provider on the wireless telephone.

19. The system of claim 10, wherein the telephone number comprises a numbering plan area number (NPA) and a central office number (NXX), and the pseudo number comprises a pseudo numbering plan area number and the central office number (NXX), wherein the pseudo numbering plan area number corresponds to the numbering plan area number (NPA), and wherein the first translation table cross-references numbering plan area/central office numbers (NPA/NXXs) with point codes and the second translation table cross-references pseudo numbering plan area numbers with real numbering plan area numbers.

20. A method for determining a network to which to forward information intended for a telephone number of a shared central office, the method comprising:

forwarding the information to the telephone number, if the telephone number does not belong to a foreign network;

creating a pseudo telephone number corresponding to the telephone number, if the telephone number belongs to a foreign network;

associating the pseudo telephone number with a point code of the foreign network; and forwarding the information to the point code, wherein the information references the pseudo telephone number.

21. The method of claim 20, further comprising translating the pseudo telephone number to the telephone number such that the information references the telephone number.

22. The method of claim 21, further comprising forwarding the information to the telephone number.

23. The method of claim 20, wherein the foreign network is a wireless network.

24. The method of claim 20, wherein the information is a message waiting indicator message generated by a messaging service provider.

25. The method of claim 20, wherein the information is generated by an integrated unified messaging system, and wherein the information is an indicator message for showing that data has been received in the integrated unified messaging system.

26. The method of claim 25, wherein the information further includes the data.

27. The method of claim 20, wherein the telephone number includes a numbering plan area number, and wherein the step of creating the pseudo telephone number comprises replacing the numbering plan area number with a pseudo numbering plan area number.

28. The method of claim 20, wherein, if the telephone number does not belong to a foreign network, the step of forwarding the information to the telephone number comprises forwarding the information to the telephone number through a host switch that owns the telephone number.

29. The method of claim 20, wherein the step of forwarding the information to the telephone number, if the telephone number does not belong to a foreign network, comprises forwarding the information to a signal transfer point through a host switch that does not own the telephone number, and forwarding the information to a point code associated with the telephone number.

30. The method of claim 20, wherein the foreign network is a global computer network.

31. The method of claim 30, wherein the global computer network is the Internet and the information is an Internet-based message waiting indicator message.

32. The method of claim 31, wherein the Internet-based message waiting indicator message generates a pop-up window displayed over a graphical user interface of a web browser.

* * * * *